United States Patent
Penet et al.

(10) Patent No.: US 9,833,941 B2
(45) Date of Patent: Dec. 5, 2017

(54) MOLD HAVING AN OFFSET PARTING LINE FOR MANUFACTURING CONTAINERS HAVING INCREASED STABILITY

(71) Applicant: SIDEL PARTICIPATIONS, Octeville sur Mer (FR)

(72) Inventors: Laurent Penet, Octeville sur Mer (FR); Pierrick Protais, Octeville sur Mer (FR); Michel Boukobza, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 312 days.

(21) Appl. No.: 14/768,259

(22) PCT Filed: Apr. 8, 2014

(86) PCT No.: PCT/FR2014/050834
§ 371 (c)(1),
(2) Date: Aug. 17, 2015

(87) PCT Pub. No.: WO2014/167235
PCT Pub. Date: Oct. 16, 2014

(65) Prior Publication Data
US 2015/0375442 A1    Dec. 31, 2015

(30) Foreign Application Priority Data
Apr. 12, 2013   (FR) ...................... 13 53351

(51) Int. Cl.
*B29C 49/42*    (2006.01)
*B29C 49/48*    (2006.01)
(Continued)

(52) U.S. Cl.
CPC .......... *B29C 49/4268* (2013.01); *B29C 49/48* (2013.01); *B29C 49/06* (2013.01);
(Continued)

(58) Field of Classification Search
CPC ................................................. B29C 49/4268
See application file for complete search history.

(56) References Cited

U.S. PATENT DOCUMENTS

| | | | |
|---|---|---|---|
| 4,465,199 A | 8/1984 | Aoki | |
| 4,576,602 A * | 3/1986 | Levin | ................... A61J 1/1406 |
| | | | 604/408 |

(Continued)

FOREIGN PATENT DOCUMENTS

| | | |
|---|---|---|
| FR | 2 938 464 A1 | 5/2010 |
| JP | 2001-88202 A | 4/2001 |

(Continued)

OTHER PUBLICATIONS

International Search Report, dated Jun. 17, 2014, corresponding to PCT Application.

*Primary Examiner* — Ryan Ochylski
(74) *Attorney, Agent, or Firm* — Young & Thompson

(57) ABSTRACT

A mold (11) for manufacturing a container (2) having a body (4) and a bottom (6), including: an annular peripheral base (8) defining a positioning plane (9); an arch (10) which extends concavely toward the inside of the container (2) from the base (8), the mold (11) including: a wall (12) having an inner surface (13) forming the cavity of the body (4) of the container (2) and having an opening therethrough, the wall (12) having an edge (23) forming the cavity of the positioning plane (9); a mold bottom (14) which is moveably mounted relative to the wall (12), the mold bottom (14) having an upper surface (15) forming the cavity of the arch (10), and a skirt (19) having an outer radial extension that is strictly lower than an inner radial extension of the positioning plane (9).

15 Claims, 2 Drawing Sheets

(51) Int. Cl.
*B29C 49/06* (2006.01)
*B29C 49/12* (2006.01)
*B29L 31/00* (2006.01)

(52) U.S. Cl.
CPC ...... *B29C 49/12* (2013.01); *B29C 2049/4892* (2013.01); *B29L 2031/7158* (2013.01)

(56) References Cited

U.S. PATENT DOCUMENTS

2003/0146551 A1* 8/2003 Weeks .................... B29C 49/50
  264/536
2009/0202766 A1 8/2009 Beuerle et al.
2012/0031916 A1 2/2012 Derrien et al.

FOREIGN PATENT DOCUMENTS

| JP | 2002-127237 A | 5/2002 |
| JP | 2008-178994 A | 8/2008 |
| JP | 2008-254244 A | 10/2008 |

* cited by examiner

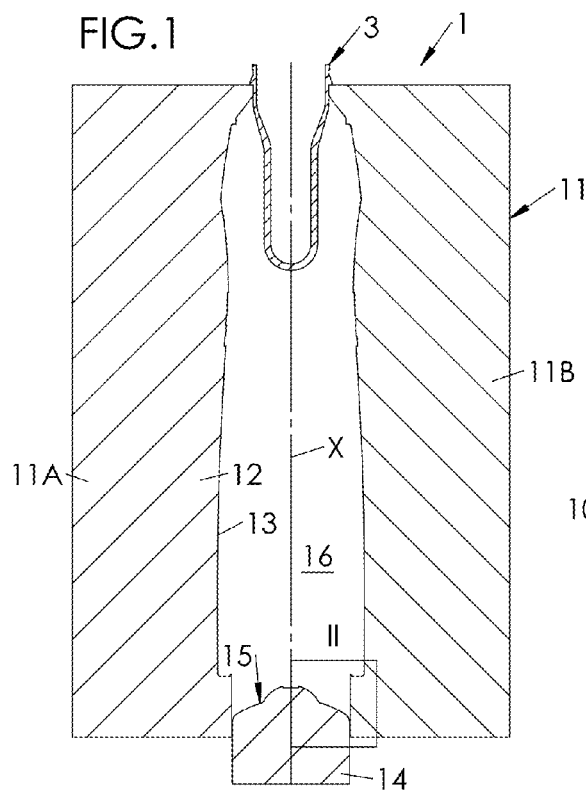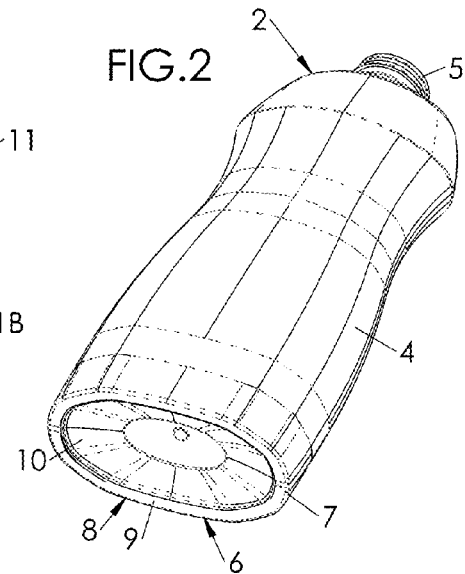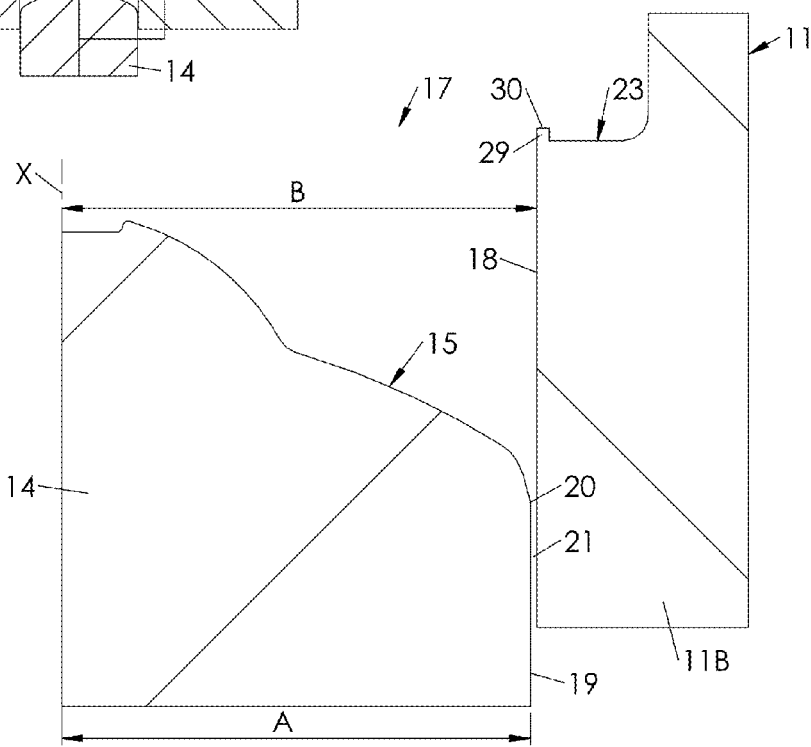

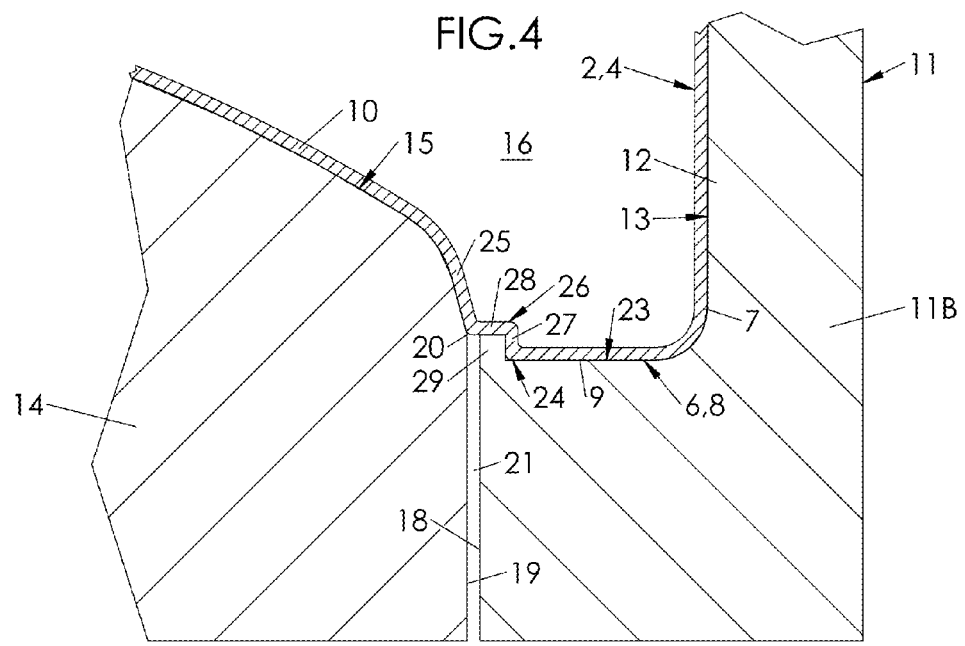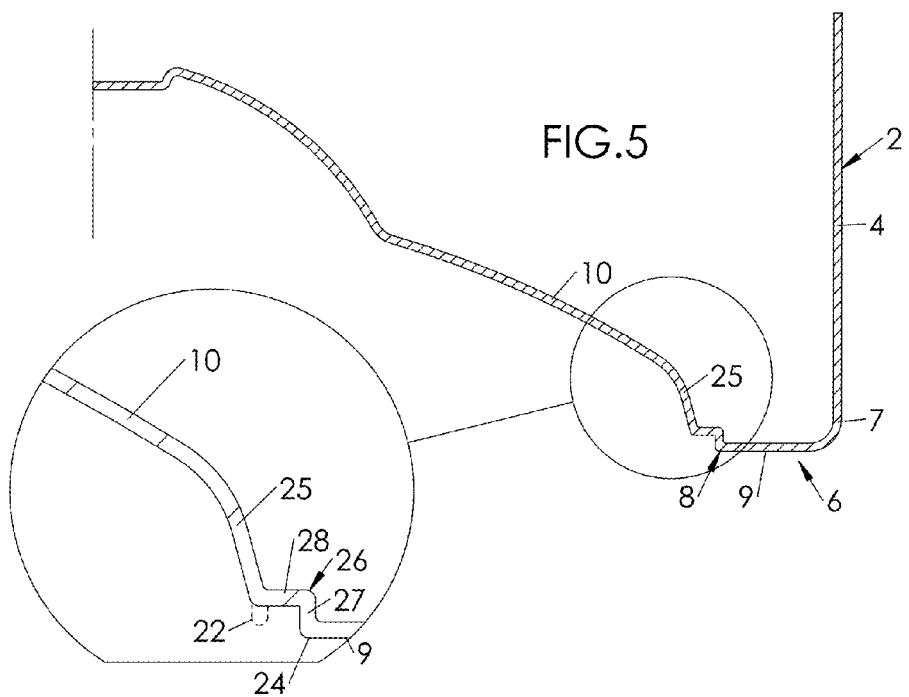

MOLD HAVING AN OFFSET PARTING LINE FOR MANUFACTURING CONTAINERS HAVING INCREASED STABILITY

The invention relates to the manufacturing of containers, such as bottles or jars, obtained by forming, and more specifically by blow molding or stretch-blow molding, from parisons of thermoplastic material.

To manufacture a container according to the blow-molding technique, the first step is to heat a parison (whether it is a preform or an intermediate container that has undergone a first blow-molding operation starting from a preform) at a temperature that is higher than the glass transition temperature of the constituent material of the parison. Next, the parison is inserted into a mold, and then the blow molding of the parison is carried out by injecting therein a fluid (such as air) under high pressure (in general greater than 26 bar).

The stretch-blow-molding technique consists, in addition to the blow molding, in stretching the parison by means of a sliding rod, so as to minimize the offsetting of the container and to make the distribution of the material as uniform as possible.

A container comprises a lateral wall (also referred to as a body), a neck that extends from an upper end of the body, and a bottom that extends from a lower end of the body, opposite the neck. The bottom of the container defines a base, in general at the junction with the body, by which the container can rest on a flat surface (such as a table).

The mold comprises a wall that defines a cavity that is designed to impart its shape to the body of the container. This cavity is closed, at a lower end, by a mold bottom designed to impart its shape to the bottom of the container.

One of the main objects targeted today by the manufacturers of containers is the reduction in the amount of material used, which is reflected by a reduction in the weight of the containers. In return for this lightening of the containers, an attempt is made to increase their rigidity by means of artifacts linked either to the method of manufacturing or to the design, because the structural rigidity associated with just the bi-orientation (axial and radial molecular orientation in relation to the longitudinal central axis of the container) appears inadequate. It even happens that certain specifications (in particular for hot filling applications or HR—"heat resistant"—in French, "resistant to heat") prescribe the reduction in weight and the increase in the structural rigidity of the container at the same time.

In the HR applications, the structural rigidity of the container can be increased thermally by means of a heat-setting (in English, "heat set") of the material, consisting in keeping the container in contact with the heated wall of the mold, which increases the crystallinity rate of the material.

Concerning more particularly the bottom of the container, its structural rigidity can also be increased (or controlled) mechanically by means of an increased local stretching of the material, by means of a mold provided with a stationary wall constituting the impression of the body of the container, and a mold bottom constituting the impression of the bottom of the container, with this mold bottom being mounted to move in relation to the wall. The container is first blow-molded beyond its final shape, in a bottom position of the mold bottom, and then the mold bottom is moved toward a top position corresponding to the final shape of the container.

This technique, referred to as "boxing," illustrated in the French patent application FR 2 938 464 (SIDEL) or its U.S. equivalent US 2012/031916, makes it possible to improve the mechanical strength of the bottom of the container, in particular in the area of the base.

In such a mold, a gap is provided between the mold bottom, mounted on a guide jack, and the wall, in such a way as to maintain between these two parts functional play that has two purposes: on the one hand, to make possible the movement without wedging of the mold bottom in relation to the wall; on the other hand, to form a decompression air-hole making it possible to evacuate the air that is trapped between the mold and the container during blow molding.

This technique is satisfactory but can be improved upon.

Actually, the functional play between the mold and the mold bottom cannot be less than the guiding precision of the jack, which is on the order of several tenths of millimeters for travel on the order of one to several tens of millimeters (in particular 20 to 30 mm).

In other words, this functional play is of the same order of magnitude as the thickness of the material of the final container. The material consequently has a tendency, during blow molding, of flowing into the gap when the mold bottom is in the bottom position. The thus pinched material forms, when the mold bottom is moved toward its top position, a thin bead of material that remains on the final container. This bead, forming a projection on the base of the container, is detrimental to the stability of the latter.

This drawback is significant in particular in flat containers, such as flasks, i.e., the containers that have a flattened shape, typically oval or rectangular, in cross-section, intended in particular for cosmetic products that in general have a high level of viscosity (pressure on the body of such containers then promoting the flow of their contents), for household products, or for certain sports drinks or alcoholic drinks (with the flattened cross-section then offering a better grip). Actually, the natural instability of these containers, due to their flattening that increases the risk of tilting in an axial plane that is parallel to their small width, is again aggravated by the presence of a bead projecting on their base.

A first solution can consist in trimming the container, so as to remove the bead, by cutting or by abrasion. This solution is not realistic on the industrial scale, however, taking into account production rates (several tens of thousands of containers per hour and per blow-molding machine).

A second solution can consist in adding to the jack a precision guiding device (for example with balls), in such a way as to reduce the functional play between the mold bottom and the wall of the mold. This solution, however, runs up against practical difficulties, because the space requirement of the guiding device would make it necessary to modify the structure of the depth of the mold, whereas the space is counted all around the latter, taking into account in particular the presence of ducts and connections that are necessary for the circulation of temperature-regulating fluids (heating and/or cooling) in the wall of the mold.

A third solution can consist in anticipating the command for raising the mold bottom, so that the material does not have time to slip back between the wall of the mold and the mold bottom. Under these conditions, however, the material that is intended for the bottom of the container is insufficiently stretched, and the base proves to be poorly formed, which reduces the advantage of the boxing.

In addition, the reduction in the functional play between the mold bottom and the wall of the mold is likely to impede the evacuation of the air that is present in the mold, with a risk of malformation of the container (with an equivalent cycle time) or with an increase in the cycle time (with an equivalent quality of the container).

One objective of the invention is to propose a technique for manufacturing containers having a correctly formed base and exhibiting both good rigidity and good stability.

For this purpose, in the first place, a mold is proposed for the manufacturing, starting from a parison, of a container having a body and a bottom in the lengthening of the body at a lower end of the body, the bottom comprising:

an annular peripheral base defining a standing plane that extends essentially perpendicular to the body from a lower end of the body, with the standing plane being delimited on the inside by an inner edge;

an arch that extends recessed toward the inside of the container from the base, this mold comprising:

a wall having an inner surface that constitutes the impression of the body of the container and that delimits a cavity, with this wall being pierced, at a lower end, by an opening, the wall having a flange that constitutes the impression of the standing plane, which extends in the lengthening of the inner surface, essentially perpendicular to the latter;

a mold bottom having an upper surface that constitutes the impression of at least the arch, and a skirt that extends axially from the upper surface opposite the opening, with the mold bottom being mounted to move in relation to the wall between an extended position, in which the upper surface is separated from the opening, toward the outside of the cavity, and a retracted position, in which the upper surface blocks the cavity, with the skirt having an outer radial extension that is strictly smaller than an inner radial extension of the standing plane, measured on the inner edge.

These arrangements make it possible to form on the container a recess in which any burr resulting from the flow of material is located between the parting line between the wall of the mold and the mold bottom. In this way, if such a burr is present, then it does not go beyond the standing plane and does not run the risk of affecting the stability of the container.

Various characteristics can be provided, by themselves or in combination:

the flange ends, toward the inside, in an annular rib bordering the opening and formed projecting toward the inside of the cavity, with this rib constituting the impression of a recess that is formed in the base of the container;

the upper surface of the mold bottom has, at its junction with the skirt, an outer edge that, in the retracted position of the mold bottom, extends on a level with an upper face of the rib;

the rib has a thickness, measured radially, that is less than or equal to half the width of the flange;

the rib has a thickness, measured radially, that is less than or equal to one-third of a width of the flange;

the rib has a thickness, measured radially, that is less than or equal to one-fifth of a width of the flange;

the rib has a thickness that is less than or equal to approximately 1 mm;

the rib has a thickness of approximately 0.5 mm;

the rib has a height, measured axially, that is less than or equal to 1 mm;

the rib has a height of approximately 0.5 mm.

In the second place, a method for manufacturing a container from a parison is proposed, with this method comprising operations that consist in:

inserting the parison into a mold as presented above, with the mold bottom being in an extended position, blow-molding the container by injecting a pressurized gas into the parison, during the blow molding, moving the mold bottom toward its retracted position.

Other objects and advantages of the invention will come to light in the description of an embodiment, provided below with reference to the accompanying drawings in which:

FIG. 1 is a cutaway view of a mold for the manufacturing of a container as illustrated in FIG. 1, comprising a wall and a movable mold bottom shown in a low position;

FIG. 2 is a bottom perspective view of a container;

FIG. 3 is a detail view of the mold of FIG. 1, according to the insert II;

FIG. 4 is a detail view similar to FIG. 3, in which the mold bottom is shown in a top position, with the container being formed;

FIG. 5 is a partial cutaway view of the bottom of the container of FIG. 1, with, as an insert, a large-scale detail centered on the junction between the base and the arch.

In FIGS. 1, 3 and 4, a unit 1 for forming a container 2 by stretch-blow molding from a parison 3—in this case, a preform—of plastic material (such as PET) is partially shown.

The container 2 that is to be formed has a body 4 that extends along a main axis X, a neck 5 that lengthens the body 4 at an upper end of the latter, and a bottom 6 that closes the body 4 at a lower end 7 of the latter, opposite to the neck 5. The bottom 6 of the container has an annular peripheral base 8 that defines a standing plane 9 that is essentially perpendicular to the axis X of the container 2 and by which the container 2 is designed to rest on a flat surface such as a table. The bottom 6 has a central arch 10 that lengthens the base 8 toward the axis X of the container 2 and extends projecting toward the inside of the latter.

In the example illustrated, the container is of the "flat flask" type, and its body 4 has a flattened shape in cross-section, in this case essentially oval. This shape extends up to the bottom 6, whose contour is essentially the same as that of the body 4 in cross-section. This type of container is designed in particular for particular applications, such as cosmetics, household products, or else sports drinks or alcoholic drinks, for which the ease of gripping the container 2 is advantageous.

The forming unit 1 comprises a mold 11 as well as blow-molding means (not shown) that include in particular a nozzle, pressurized gas sources, and solenoid valves that, in a standard manner, are, for example, assembled in a block that tops the nozzle. The unit 1 comprises a stretching rod, sliding in the nozzle.

The mold 11 is, for example, of the portfolio type and comprises two half-molds 11A, 11B articulated around a hinge, with these two half-molds being opened to make possible, at the beginning of the forming cycle, the insertion of a preheated parison 3, and, at the end of the cycle, the evacuation of the formed container 2.

As the figures show, the mold 11 comprises a lateral wall 12 defining an inner surface 13 that constitutes the impression of the body 4 of the container 2, and a mold bottom 14 having a surface 15 that constitutes the impression of a part of the bottom 6.

The inner surface 13 delimits a cavity 16 into which the parison 3 is inserted and in which the forming takes place. The inner surface 13 extends around a central axis that is merged with the axis X of the container 2 that is to be formed.

In the illustrated example where, as we saw, the container 2 is not symmetrical in rotation but rather is flattened, the same is true of the inner surface 13, which in cross-section (perpendicular to the axis X) has an oval shape.

The lateral wall 12 is pierced, at a lower end, by an opening 17 that is lengthened axially by a bore 18.

The mold bottom 14 is mounted to move axially in relation to the wall 12 between an extended position (FIGS. 1 and 3), in which the upper surface 15 is separated from the opening 17, toward the outside of the cavity 16, and a retracted position (FIG. 4), in which the upper surface 15 closes the cavity 16 by blocking the opening 17 for completing the impression of the container 2.

The purpose of the mobility of the mold bottom 14 is to make possible, during the forming, an increased local stretching of the bottom 6 of the container 2, in the course of an operation called boxing during which the mold bottom 14, initially in the extended position, is moved toward its refracted position. For this purpose, the mold bottom 14 is, for example, mounted on a pneumatic or hydraulic jack (not shown).

In the configuration illustrated in the figures—provided by way of illustrative example—where the container 2 is oriented with the neck 5 on top, the extended position of the mold bottom 14 corresponds to a bottom position, and its retracted position corresponds to a top position.

As illustrated in FIGS. 1, 3 and 4, the mold bottom 14 is provided with a skirt 19, with a section that is complementary to that of the bore 18 (in this case, oval), which extends axially from an outer edge 20 of the upper surface 15. This skirt 19 is housed in the bore 18 with a play 21 of several tenths of millimeters for making possible the sliding of the mold bottom 14 from its bottom position to its top position and vice versa. This play 21 is, by generalization of the usual molding terminology, referred to as "parting line," even though it is not flat and has a certain thickness.

The thickness of the parting line 21 is of the same order of magnitude as the final thickness of material constituting the container 2. There consequently exists a risk that upon the occasion of forming, a material bead comes to be formed by flowing into the parting line 21, in such a way that a burr 22 (shown in dotted lines in the circle of detail in FIG. 5) forms on the bottom 6 of the container 2.

The mold 11 is designed, however, so that this possible burr 22 does not impair the stability of the container 2, primarily when the container 2 is, as in the illustrated example, a flat flask. More specifically, the mold 11 is designed so that the possible burr 22 does not project over the standing plane 9 but is offset, in relation to the latter, toward the inside of the container 2.

As shown in the figures, and in particular in FIG. 4 that shows in detail a part of the bottom 6 of the container 2 at the end of forming, with the bottom 6 applied against the mold 11, the impression of the standing plane 9 is integrally formed in the wall 12, and more specifically by a flange 23 of the wall 12, which extends in the lengthening of the inner surface 13, essentially perpendicular to the latter.

Furthermore, the skirt 19 has an outer radial extension A that is strictly less than an inner radial extension B of the standing plane 9, measured on an inner edge 24 delimiting the latter toward the inside.

In this way, the parting line 21 is not found on a level with the standing plane 9 but is offset toward the axis X, and therefore toward the arch 10.

According to an embodiment, not shown, the parting line 21 (and therefore the possible burr 22) is located on a level with the arch 10, for example on a level with a peripheral cross-section 25 of the arch 10, in a truncated, cone-shaped form at a small angle to the apex (less than or equal to 10°). However, in this case, the burr 22, which extends axially, is likely to deform locally the peripheral cross-section 25 of the arch and, consequently, to impair the function of the arch 10, consisting in offering a mechanical strength to the hydrostatic pressure exerted by the contents of the container 2.

According to a preferred embodiment illustrated in the figures, and more particularly visible in FIG. 5, the container 2 is specially designed for preventing both the possible burr 22 from projecting from the standing plane 9 and this burr 22 from affecting the mechanical function of the bottom 6, and in particular the arch 10.

For this purpose, the base 8 is provided with a recess 26 formed toward the inside of the container 2, at the junction between the standing plane 9 and the arch 10. This recess 26 has an outer section 27, which extends axially, essentially perpendicular to the standing plane 9, and an inner section 28, which extends crosswise (or radially) from an upper edge of the outer section 27, on the inside in the direction of the axis X, up to a lower edge of the peripheral section 25 of the arch 10.

The impression of the recess 26 is formed in the wall 12 and more specifically on the flange 23, around the opening 17.

For this purpose, and as FIGS. 3 and 4 show, the flange 23 ends, toward the inside, in an annular rib 29 that constitutes the impression of the recess 26 and that borders the opening 17 by extending axially projecting toward the inside of the cavity 16. This rib 29, which delimits the flange 23 on the inside, in this case has an essentially square contour, complementary to the recess 26, and has an upper face 30 that constitutes the impression of the inner section 28 of the recess 26, which extends in a plane that is perpendicular to the axis X. In the top position of the mold bottom 14, the outer edge 20 of the upper surface 15 extends on a level with the upper face 30, in such a way as to correctly complete the impression of the bottom 6 of the container 2.

As shown in FIG. 4, the mold 11 is sized so that the parting line 21 extends on a level with the inner section 28 of the recess 26. In this way, the possible burr 22 is formed in axial projection toward the outside of the container 2 from the inner section 28, as illustrated in the insert detail of FIG. 5. Thus offset both radially and axially toward the inside of the container 2 in relation to the standing plane 9, the burr 22 in no way affects the stability of the container 2. Likewise, the thus reinforced burr 22 in the recess 26 is not very perceptible, both visually and to the touch, by the user.

The outer section 27 of the recess 26 preferably is low, measured axially, in relation to the height of the arch 10. In a corresponding manner, the rib 29 is low relative to the height of the upper surface 15 of the arch 10. According to a preferred embodiment, the height of the recess 26 (i.e., the height of the rib 29, or else the height of the outer section 27) is less than or equal to approximately 1 mm, and, for example, approximately 0.5 mm.

Likewise, the inner section 28 of the recess 26 preferably has a small width, measured radially, in relation to the width—also measured radially—of the standing plane 9 (or of the base 8). In a corresponding manner, the rib 29 has a small thickness relative to the width of the flange 23. According to a preferred embodiment, the width of the recess 26 (i.e., the width of the inner section 28) is less than or equal to approximately half the width of the standing plane 9. The thickness of the rib 29, equal to that of the recess 26, aside from the thickness of the parting line 21, is also less than or equal to approximately half the width of the flange 23. In some cases, this ratio is also small, in particular in the case of medium-capacity or large-capacity containers, for which this ratio can be less than ⅓, and even ⅕. According to a preferred embodiment, the width of the recess 26 (i.e., the thickness of the rib 29) is less than or equal to approximately 1 mm, and, for example, approximately 0.5 mm.

These dimensions make it possible to form a recess 26 that is both wide enough and deep enough to accommodate the burr 22 while preventing the latter from going beyond the standing plane 9, and small enough not to affect the blowability of the container 2 (i.e., the capacity of the material to correctly assume the shape of the mold 11) while being relatively imperceptible to the user.

In the first place, because of the offset of the parting line 21 toward the axis X, a better stability of the container 2 results, due to the absence of a burr on the standing plane 9. Assuming that a burr 22 would exist, it would be absorbed in the recess 26 and, consequently, offset both axially and radially from the standing plane 9 toward the inside of the container 2.

In the second place, from the presence of the recess 26, good stability of the bottom 6, and in particular of the arch 10, whose impression is integrally formed by the upper surface 15 of the mold bottom 6 and whose material is thus distributed without being affected by a possible flowing into the parting line 21, results.

In the third place, because of the small dimensions of the recess 26 (and therefore of the rib 29), a good blowability of the container 2 results, which thus is not affected by the offset of the parting line 21.

The manufacturing of a container 2 from a parison 3 can be carried out as follows.

The first step is to insert the preheated parison 3 into the open mold 11. The mold bottom 14 is then in the bottom position. The mold 11 is closed again, and then the stretching rod is moved in the direction of the mold bottom 14 until flattening there the thus stretched material of the preform 3, while a fluid (typically air) under a pre-blow-molding pressure (on the order of 5 to 7 bar) is injected into the preform 3.

When the rod reaches the mold bottom 14 by flattening the material there, the mold bottom 14 is always found in its bottom position. The pre-blow-molding pressure is not adequate for flattening the material tightly against the wall 12 of the mold 11; for this, it is necessary to inject a fluid (typically air) into the container 2 being formed at a blow-molding pressure that is higher than the pre-blow-molding pressure (in practice, the blow-molding pressure is on the order of 20 to 30 bar).

The raising of the mold bottom 14 is preferably initiated during the blow-molding operation in such a way as to impart to the material of the bottom 6 an additional stretching that promotes the orientation of the molecules and the taking of the impression of the material on the upper surface 15 of the mold bottom 14 and on the flange 23, including the rib 29.

During the raising of the mold bottom 14, it may be that a (relatively small) quantity of material is pinched in the parting line 21. As we have seen, this material, which forms a burr 22, remains localized in the inner section 28 of the recess and, in the final container 2, does not go beyond the standing plane 9.

The stretching rod, kept in contact (via the material of the bottom 6 of the container 2) against the mold bottom 14 during the raising of the latter, is then withdrawn, the inside of the container 2 is put in the open air, and the container 2 is evacuated before the cycle is repeated for the next container.

The invention claimed is:

1. Mold (11) for the manufacturing, starting from a parison (3), of a container (2) having a body (4) and a bottom (6) in the lengthening of the body (4) at a lower end of the body (4), the bottom (6) comprising:
   an annular peripheral base (8) defining a standing plane (9) that extends essentially perpendicular to the body (4) from a lower end of the body (4), with the standing plane (9) being delimited on the inside by an inner edge (24);
   an arch (10) that extends recessed toward the inside of the container (2) from the base (8),
   this mold (11) comprising:
   a wall (12) having an inner surface (13) that constitutes the impression of the body (4) of the container (2) and that delimits a cavity (16), with this wall (12) being pierced, at a lower end, by an opening (17);
   a mold bottom (14) having an upper surface (15) that constitutes the impression of at least the arch (10), and a skirt (19) that extends axially from the upper surface (15) opposite the opening (17), with the mold bottom (14) being mounted to move in relation to the wall (12) between an extended position, in which the upper surface (15) is separated from the opening (17), toward the outside of the cavity (16), and a retracted position, in which the upper surface (15) blocks the cavity (16);
   the wall (12) has a flange (23) that constitutes the impression of the standing plane (9), which extends in the lengthening of the inner surface (13), essentially perpendicular to the latter;
   with this mold (11) being characterized in that the flange (23) ends, toward the
inside, in an annular rib (29) that borders the opening and that is formed projecting toward the inside of the cavity (16).

2. Mold (11) according to claim 1, wherein the upper surface (15) of the mold bottom (14) has, at its junction with the skirt (19), an outer edge (20) that, in the retracted position of the mold bottom (14), extends on a level with an upper face (30) of the rib (29).

3. Mold (11) according to claim 2, wherein the rib (29) has a thickness, measured radially, that is less than or equal to half the width of the flange (23).

4. Mold (11) according to claim 2, wherein the rib (29) has a thickness, measured radially, that is less than or equal to one-third of a width of the flange (23).

5. Mold (11) according to claim 2 wherein the rib (29) has a thickness, measured radially, that is less than or equal to one-fifth of a width of the flange (23).

6. Mold (11) according to claim 2, wherein the rib (29) has a thickness that is less than or equal to approximately 1 mm.

7. Mold (11) according to claim 2, wherein the rib (29) has a height, measured axially, that is less than or equal to 1 mm.

8. Mold (11) according to claim 1, wherein the rib (29) has a thickness, measured radially, that is less than or equal to half the width of the flange (23).

9. Mold (11) according to claim 1, wherein the rib (29) has a thickness, measured radially, that is less than or equal to one-third of a width of the flange (23).

10. Mold (11) according to claim 1, wherein the rib (29) has a thickness, measured radially, that is less than or equal to one-fifth of a width of the flange (23).

11. Mold (11) according to claim 1, wherein the rib (29) has a thickness that is less than or equal to approximately 1 mm.

12. Mold (11) according to claim 11, wherein the rib (29) has a thickness of approximately 0.5 mm.

13. Mold (11) according to claim 1, wherein the rib (29) has a height, measured axially, that is less than or equal to 1 mm.

14. Mold (11) according to claim 13, wherein the rib (29) has a height of approximately 0.5 mm.

15. Process for manufacturing a container (2) from a parison (3), with this process comprising the operations that consist in:
- inserting the parison (3) into a mold according to claim 1, with the mold bottom (14) being in an extended position,
- blow-molding the container (2) by injecting a pressurized gas into the parison,
- during the blow molding, moving the mold bottom (14) toward its retracted position.

\* \* \* \* \*